United States Patent [19]

Polfer et al.

[11] Patent Number: 5,968,147
[45] Date of Patent: Oct. 19, 1999

[54] METHOD AND APPARATUS FOR IMPROVED PERIPHERAL BUS UTILIZATION

[75] Inventors: Daniel A. Polfer, Winter Park, Fla.; Michael D. Berhan, Santa Clara, Calif.; Peter C. Diemer; Andrea D'Amato, both of San Jose, Calif.; Michael S. McMurdie, Pleasanton, Calif.

[73] Assignee: Adaptec, Inc., Milpitas, Calif.

[21] Appl. No.: 08/938,110

[22] Filed: Sep. 26, 1997

[51] Int. Cl.$^6$ ..................................................... G06F 13/00
[52] U.S. Cl. ........................... 710/52; 710/57; 713/323; 369/54; 369/60; 711/154
[58] Field of Search ..................................... 395/872, 877, 395/750; 364/707; 711/154, 157, 156; 369/54, 60; 710/52, 57; 713/300–340

[56] References Cited

U.S. PATENT DOCUMENTS

| | | | |
|---|---|---|---|
| 4,378,588 | 3/1983 | Katzman et al. | 395/877 |
| 5,613,162 | 3/1997 | Kabenjian | 395/872 |
| 5,771,359 | 6/1998 | Galloway et al. | 395/308 |

OTHER PUBLICATIONS

Unknown, "*11 ATAPI: CD–ROMs and Tapes*", Aug. 1997, pp. 1–6, Atapi.

D. Niggemann, "*SCSI II Disconnect/Reconnect Problem*", Jan. 12, 1995, Jesus College, Cambridge, CB58BL.

Unknown, "*Track–at–Once, Disc–at–Once*", 1995, Rev. Jul. 15, 1997, Adaptec Software Products Group, Adaptec, Inc.

*Primary Examiner*—Glenn A. Auve
*Assistant Examiner*—Rupal Dharia
*Attorney, Agent, or Firm*—Martine Penilla & Kim, LLP

[57] ABSTRACT

Disclosed is a system for minimizing the utilization of an I/O bus by a first data-writing peripheral device that is connected to the I/O bus. The system has a second peripheral device that shares the I/O bus connection. The system includes the operations of transferring data to a drive buffer that is in the first data-writing peripheral device. The transferring being configured to continue until the drive buffer has reached a full state. Performing a pre-write calibration of the first data-writing peripheral device after the drive buffer has reached the full state. Commencing a writing of a portion of the data contained in the drive buffer, such that the first data received by the drive buffer is written first. The system further including releasing the I/O bus connection by placing a write thread of the first data-writing peripheral device in a sleep mode. Wherein when the write thread of the first data-writing peripheral device is in the sleep mode the I/O bus connection is made available to the second peripheral device while the first data-writing peripheral device is not transferring data. The system further includes continually bring the write thread of the first data-writing peripheral device out of the sleep mode to perform a data burst when the drive buffer has emptied to a critical level and then placing the write thread back to the sleep mode after the data burst.

32 Claims, 7 Drawing Sheets

METHOD AND APPARATUS FOR IMPROVED PERIPHERAL BUS UTILIZATION

BACKGROUND OF THE INVENTION

1. Field of the Invention

This invention relates generally to input/output bus connections and computer peripheral devices, and more particularly to methods and apparatus for efficiently sharing input/output bus connections with peripheral devices.

2. Description of the Related Art

Most computer systems of today are designed to be flexible systems that are typically customized to meet the particular needs of a user. Therefore, the motherboards of most computer systems are designed with a number of input/output (I/O) connections. The types of connections and the number of connections will vary from computer to computer, but recently, most modern computer systems have PCI I/O bus connections, and IDE/ATAPI I/O bus connections integrated directly into the computer system's motherboard. Of course, host adapters may also be used to connect SCSI I/O bus connections to, for example, a PCI I/O bus connection. Through these I/O bus connections, users are able to connect various peripheral devices, such as, CD-ROM drives, CD-R Drives, CD-RW drives, DVD drives, printers, scanners, second hard drives, etc.

For ease of discussion, FIG. 1A shows a computer system's motherboard 102 having a number of I/O bus connections for interconnecting to external peripheral devices. As shown, the motherboard 102 may be equipped with several I/O bus connections, such as, a secondary channel IDE/ATAPI (I/O) 104, a primary channel IDE/ATAPI (I/O) 106, a PCI (I/O) 108, a SCSI (I/O), and a parallel port (I/O) (not shown). In this example, the motherboard 102 has a processor (CPU) 101 for controlling the processing of data in the computer system, as well as interacting with any of the number of peripheral devices. Although there is a wide selection of peripheral devices that may be purchased and connected to the computer system's motherboard 102, the cost of the varying types of devices is not the same.

By way of example, although SCSI peripheral devices have in the past been more common and have several I/O bus connection advantages, IDE/ATAPI peripheral devices are quickly becoming more common place. This is because IDE/ATAPI peripheral devices are substantially less expensive than SCSI and other higher-end peripheral devices. In addition, when SCSI devices are used, the user will also be required to purchase a separate host adapter, which necessarily drives up the cost of SCSI devices. In response to the increased popularity of IDE/ATAPI peripheral devices, most computer manufacturers have been installing IDE/ATAPI I/O bus connections directly into the computer system's motherboard as shown in FIG. 1A.

In FIG. 1A, each of the IDE/ATAPI (I/O) bus connections 104 and 106 are coupled to two peripheral devices. Specifically, the secondary channel IDE/ATAPI (I/O) 104 is connected to a compact disc-recordable (CD-R) drive 110. In this example, CD-R drive 110 is connected as a "master," and an other device 112 is connected as a "slave" device. For completeness, a hard drive device 114 that is set to be a master, and a device 116 that is set to be a slave are connected to the primary channel IDE/ATAPI (I/O) 106.

As mentioned above, although some higher end compute I/O directly integrated into the motherboard, most do not, and are therefore required to use a SCSI host adapter card 118. The host adapter card 118 is shown connected to an I/O 108 of the motherboard 102, which may be a PCI I/O bus. The host adapter card 118 is therefore used to connect up to 7 peripheral devices. In SCSI, each of the peripheral devices is given an ID number that establishes an arbitration priority for the bus. The SCSI protocol also has a well known "disconnect/reconnect" feature that enables a SCSI peripheral device to release the bus and make it available for other SCSI peripheral devices when data is not being transferred by a given peripheral device.

Although this feature works well in SCSI devices, IDE/ATAPI devices which are becoming ever more popular and are typically less expensive than SCSI devices do not have a disconnect/reconnect feature. Therefore, when one IDE/ATAPI device is in control of the bus, it will block access to the bus for the whole time while the IDE/ATAPI device is performing its function. In fact, the bus will remain inaccessibly to other devices even if no data is being transferred to or from the IDE/ATAPI device.

FIG. 1B shows a timing diagram that illustrates the typical stages of a data writing operation (i.e., burning of data) performed by an IDE/ATAPI CD-R drive 110. As mentioned above, a critical aspect of CD-R operations (or other media writing operations) is to ensure that the CD-R 110 device does not run out of data while it is performing a write to a CD media. As shown, when a CD-R write operation is to be performed through the CD-R drive 110, data is initially transferred to the buffer of the CD-R drive 110 during time 150, until the buffer is completely full. Once full, a pre-write calibration operation is commenced, where the CD-R drive's laser is powered up, the head mechanics are positioned, a power calibration is performed, and the writing operation is begun during a time 152.

During time 152, additional data may have been transferred to the CD-R drive's buffer, which leaves small windows of time 140a, 140b, 140c, to 140n for the slave device 112 to access the IDE/ATAPI (I/O) bus connection 104 (i.e., the IDE/ATAPI bus is made accessible to other devices). After these short windows expire, the bus will again become inaccessible, even though data transfers from the host to the CD-R drive 110 may only be occurring for a small fraction of the busy times 154. As a result, once the CD-R drive 110 takes control of the bus, it will virtually cut-off access to the slave IDE/ATAPI device, even if no data transfers are occurring during the busy times 154. In one example, if the user desired to copy data from a slave drive (i.e., a CD-ROM) and write the copied data to a master CD-R drive, the CD-R drive would most likely run out of data to write, and therefore ruin the CD media. This is a likely scenario because the CD-ROM drive is only able to access the bus during the small window of time 140a, 140b, 140c, 140n. As a result, the data stored in the CD media of the CD-ROM may not be accessed sufficiently to enable a transfer of that data to the CD-R drive.

As a further problem, the host CPU, e.g., processor CPU 101 will also remain busy during the busy times 154. Unfortunately, many of the standard computer operations, such as, multi-tasking in other computer programs, scrolling up and down text, and moving a computer mouse across a screen may become jerky, sluggish, or cause a system freeze for several seconds. Consequently, current IDE/ATAPI devices place a severe burden on a host's CPU and make bus access by slave devices virtually impossible.

In view of the foregoing, there is a need for a method and an apparatus that enables a first peripheral device to efficiently communicate to a bus, and also enables other peripheral devices that share the same bus to communicate through the bus when the first peripheral device is not currently in the process of transferring data over the bus.

SUMMARY OF THE INVENTION

Broadly speaking, the present invention fills these needs by providing a method and apparatus for efficiently transferring data over a shared peripheral I/O bus connection. It should be appreciated that the present invention can be implemented in numerous ways, including as a process, an apparatus, a system, a device, a method, or a computer readable medium. Several inventive embodiments of the present invention are described below.

In one embodiment, a method for sharing an I/O bus connection by peripheral devices is disclosed. The peripheral devices include a first CD-R peripheral device that is connected to the I/O bus connection, and a second peripheral device that is connected to the I/O bus connection. The method includes transferring data to a drive buffer that is in the first CD-R peripheral device. The transferring being configured to continue until the drive buffer has reached a full state. Performing a pre-write calibration of the first CD-R peripheral device after the drive buffer has reached the full state. Commencing a writing of a portion of the data contained in the drive buffer, such that the first data received by the drive buffer is written first. The method further includes releasing the I/O bus connection by placing a write thread of the first CD-R peripheral device in a sleep mode. Wherein when the write thread of the first CD-R peripheral device is in the sleep mode the I/O bus connection is made available to the second peripheral device while the first CD-R peripheral device is not transferring data. The method further includes continually having the write thread of the first CD-R peripheral device come out of the sleep mode to perform a data burst when the drive buffer has emptied to a critical level and then going back to the sleep mode after the data burst.

In another embodiment, a system for minimizing utilization of an I/O bus by a first data-writing peripheral device that is connected to the I/O bus is disclosed. The system also includes a second peripheral device that shares the I/O bus connection. The system includes the operations of transferring data to a drive buffer that is in the first data-writing peripheral device. The transferring being configured to continue until the drive buffer has reached a full state. Performing a pre-write calibration of the first data-writing peripheral device after the drive buffer has reached the full state. Commencing a writing of a portion of the data contained in the drive buffer, such that the first data received by the drive buffer is written first. The system further including releasing the I/O bus connection by placing the a write thread of the first data-writing peripheral device in a sleep mode. Wherein when the write thread of the first data-writing peripheral device is in the sleep mode the I/O bus connection is made available to the second peripheral device while the first data-writing peripheral device is not transferring data. The system further includes continually having the write thread of the first data-writing peripheral device come out of the sleep mode to perform a data burst when the drive buffer has emptied to a critical level and then going back to the sleep mode after the data burst.

In yet a further embodiment, an apparatus for minimizing utilization of an I/O bus by a first data-writing peripheral device that is connected to the I/O bus, and a second peripheral device that shares the I/O bus connection is disclosed. The apparatus includes a drive buffer that is contained in the first data-writing peripheral device, and is configured to receive data until the drive buffer has reached a full state. A writing mechanism of the first data-writing peripheral device that is configured to commence writing of a portion of the data contained in the drive buffer. Wherein a write thread of the first data-writing peripheral device is paced into a sleep mode while the writing mechanism is writing the portion of the data contained in the drive buffer, and when the write thread of the first data-writing peripheral device is in the sleep mode, the I/O bus connection is made available to the second peripheral device.

In still a further embodiment, a computer readable media containing program instructions to be executed on a central processing unit for minimizing utilization of an I/O bus by a first data-writing peripheral device that is connected to the I/O bus is disclosed. A second peripheral device is configured to share the I/O bus connection. The computer readable media includes program instructions for transferring data to a drive buffer that is in the first data-writing peripheral device. The transferring being configured to continue until the drive buffer has reached a full state. Program instructions for commencing a writing of a portion of the data contained in the drive buffer. The computer readable media further including program instructions for releasing the I/O bus connection by placing a write thread of the first data-writing peripheral device in a sleep mode. Wherein when the write thread of the first data-writing peripheral device is in the sleep mode the I/O bus connection is made available to the second peripheral device while the first data-writing peripheral device is not transferring data.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for a method and apparatus that enables efficient transfers of data over a shared peripheral I/O bus connection. It will be obvious, however, to one skilled in the art, that the present invention may be practiced without some or all of these specific details. In other instances, well known process operations have not been described in detail in order not to unnecessarily obscure the present invention.

Figure 2:
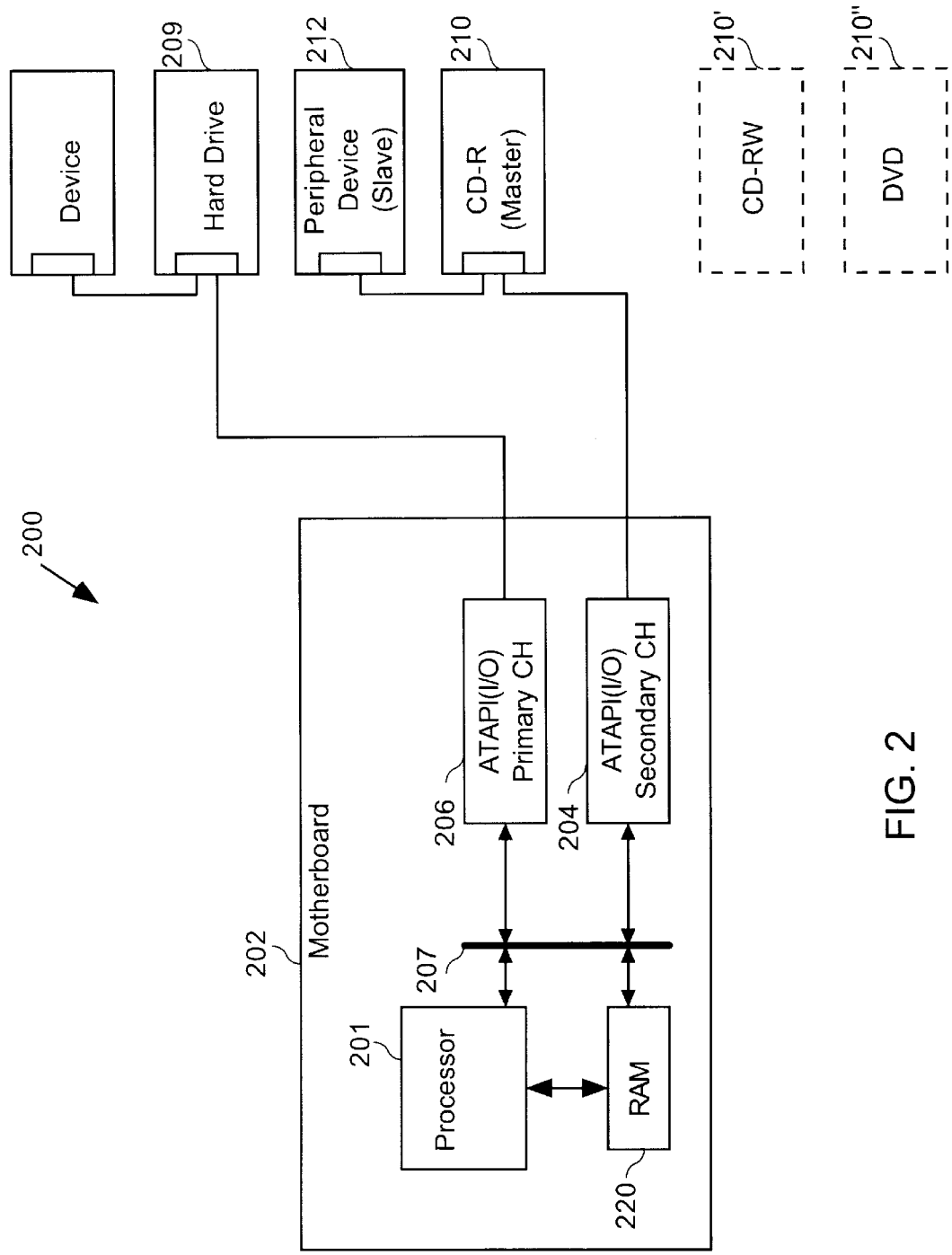
FIG. 2 shows a block diagram of a motherboard of a computer system that is connected to peripheral devices that share I/O connections in accordance with one embodiment of the present invention.

FIG. 2 shows a block diagram 200 of a motherboard 202 of a computer system that is connected to peripheral devices that share I/O connections in accordance with one embodiment of the present invention. As shown, the motherboard 202 typically includes a processor 201 and a random access memory (RAM) 220 that is bi-directionally coupled to the processor 201. The RAM 220 is shown coupled to an internal bus 207 which may be used to couple to any number of different types of I/O bus connections, including IDE/ATAPI (I/O) bus connections.

In this example, a secondary channel IDE/ATAPI (I/O) bus connection 204 is coupled to the internal bus 207 and connected to a CD-R drive 210. As is common in IDE/ATAPI, a second device may be coupled to the CD-R drive 210, as a slave peripheral device 212. Although the CD-R drive 210 may be connected as a master device in one embodiment, the inventive embodiments of the present invention are also applicable to situations where the CD-R drive 210 is connected as a slave device, and another device is connected as a master device. Therefore, in the following description, the exemplary CD-R drive 210 (or other data-writing drives) will be connected as master devices, although they may be equally connected as slave drives without limiting the inventive embodiments of the present invention.

A second IDE/ATAPI (I/O) 206 is also typically provided as a primary channel, through which a master and a slave peripheral device may be connected for securing access to the internal bus 207 of the motherboard 202. In this example, a hard drive 209 device is connected to the primary channel. Further, other I/O connections, such as, parallel port I/O connections may make use of the inventive software driver operations of the present invention. By way of example, a parallel port I/O connection may be coupled to one of the primary or secondary ATAPI channels, thus enabling peripheral devices that only have parallel port jacks to connect up to an ATAPI channel.

In one embodiment of the present invention, the CD-R drive 210 may be any suitable drive in which shared access to a bus is critical during the operation of several devices. By way of example, other drives may include a CD-RW drive 210', a DVD drive 210", or any other device that may be sharing bandwidth access to a single bus. A particular advantage of the present invention is that the drive designated as a master peripheral device will no longer cause the IDE/ATAPI bus to remain busy when data transfers are not occurring or in progress between RAM 220 of the motherboard 202 and a memory contained within the drive 210. In this manner, other peripheral devices may gain access to the IDE/ATAPI bus when no data transfers are in progress. As can be appreciated, by freeing up the IDE/ATAPI bus when the master device is not in the process of performing a data transfer, the slave peripheral device may exchange data with the RAM 220. Further yet, the computer system of the motherboard 202 may request that data be read from a slave peripheral device, e.g., a CD-ROM, to enable the transfer of the data read from the CD-ROM to the master CD-R device 210.

This is particularly important when the master CD-R drive 210 is performing a copy of data from a CD media that is in the slave CD-ROM drive. As a result, because the slave CD-ROM drive is able to gain access to the bus when the CD-R drive 210 is not transferring data (i.e., performing a data burst), the CD-R drive 210 will be able to continue writing data (i.e., burning data) to the media without running-out of data to write. As mentioned above, if the CD-R drive 210 ever runs out of data to write when it is writing a track, the entire media will be ruined.

Figures 1A, 1B:
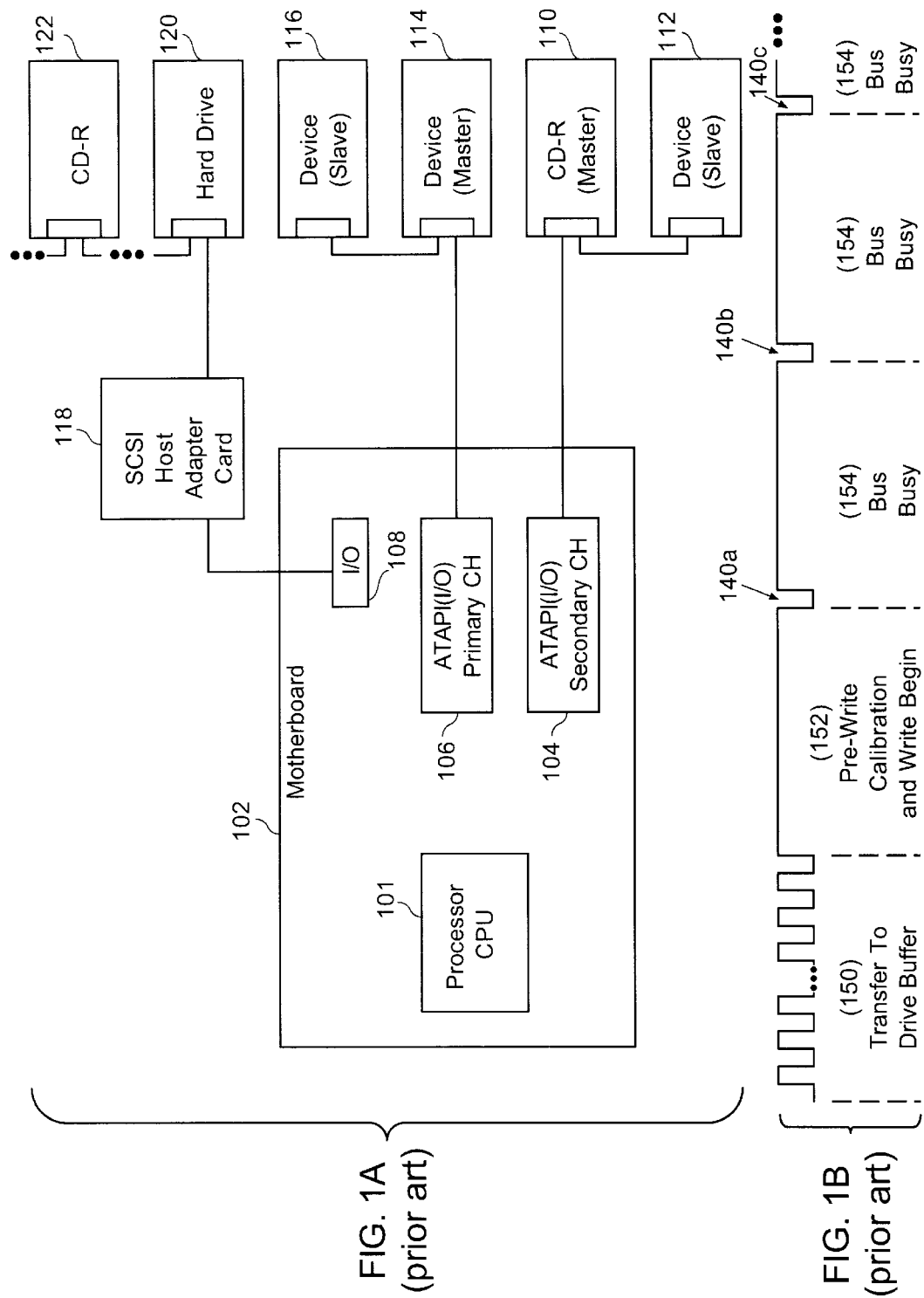
FIG. 1A shows a computer system's motherboard having a number of I/O bus connections for interconnecting to external peripheral devices.
FIG. 1B shows a timing diagram identifying the typical stages of a data writing operation (i.e., burning of data) performed by a CD-R drive over an IDE/ATAPI bus.

As a further advantage, because the master device (i.e., the CD-R drive 210) is no longer occupying the IDE/ATAPI bus when no data transfer is actually occurring as shown in FIG. 1B above, the processor 201 of the motherboard 202 will no longer be tied-up during the entire process being performed by the master device. Therefore, the computer system having the motherboard 202 will now be able to more efficiently process other computing tasks without appearing sluggish or continually freezing.

Figure 3:
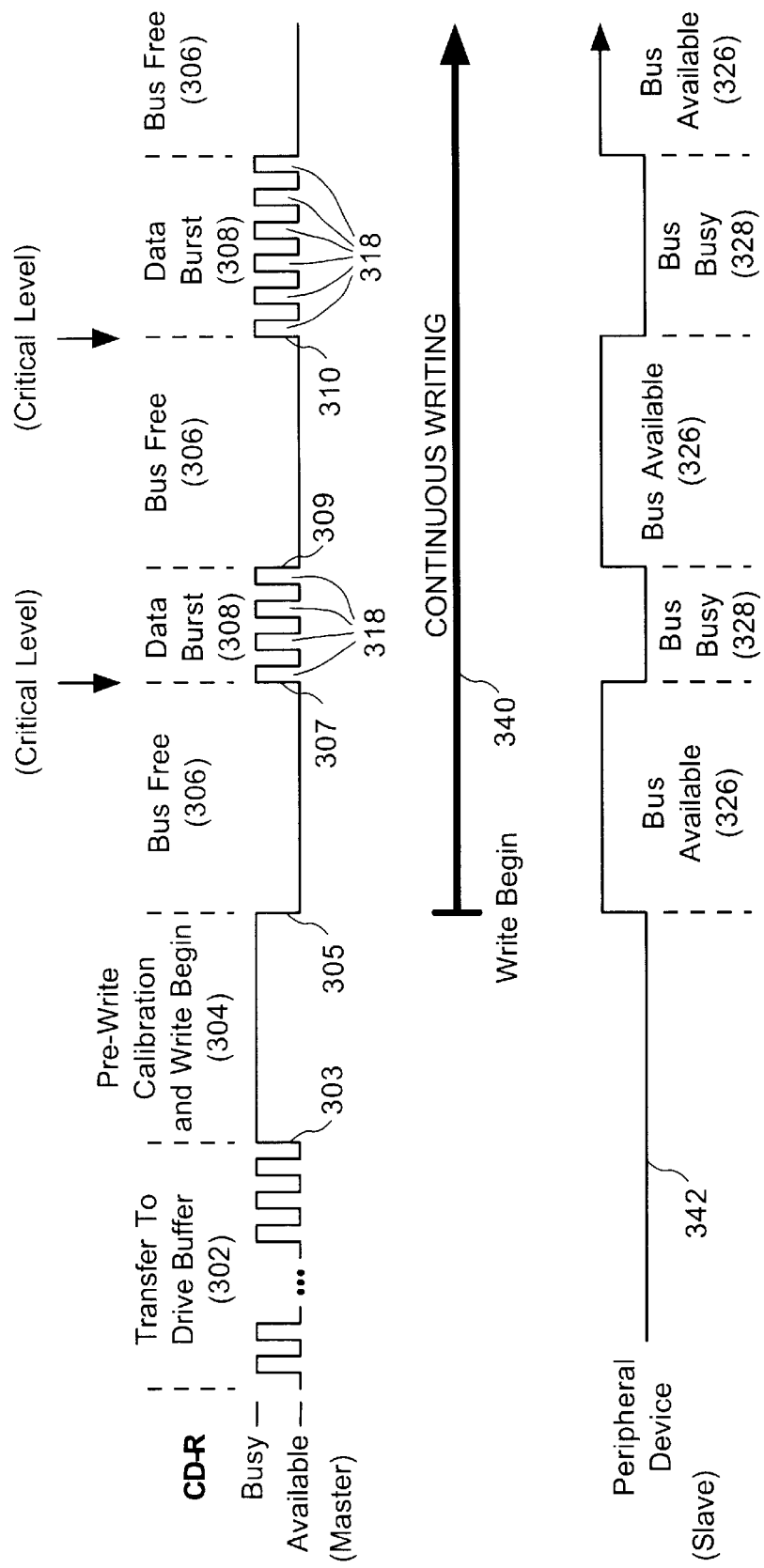
FIG. 3 shows a timing diagram of the improved and efficient processing performed by devices that share an I/O bus connection in accordance with one embodiment of the present invention.

FIG. 3 shows a timing diagram of the improved and efficient processing performed by devices that share an I/O bus connection in accordance with one embodiment of the present invention. Although an IDE/ATAPI bus arrangement having a master and a slave peripheral device will be discussed in great detail for clarity and understanding, it should be understood that the minimized utilization of a bus by one device in a shared bus arrangement (i.e., a master and slave) may be applied to all types of bus I/O's that are shared by multiple devices. With this in mind, the topmost timing diagram of FIG. 3 shows the improved bus utilization by a master CD-R drive.

Initially, a drive buffer in the CD-R drive 210 will be required to be filled-up before a writing operation is commenced by the CD-R drive 210. Therefore, a transfer to a drive buffer will be performed during time 302, during which a RAM-to-RAM data transfer is performed across an IDE/ATAPI bus. By way of example, the data transfer may occur between the RAM 220 of the motherboard 202 and the drive buffer contained within the CD-R drive.

When the drive buffer receives data that is more than its capacity (i.e., at a point 303), a pre-write calibration and write-begin operation occurs during a time 304. Typically, the calibration includes operations such as a CD-R laser power-up, positioning of head mechanics to move the CD-R arm to a correct location over the media, and power calibrations of the laser. At a point 305, the calibration will be finished and the write operation will begin (e.g., as signified by line 340), thereby commencing the burning of the data into the CD media.

Once the write operation begins, the drive buffer of the CD-R drive should always be sufficiently full with data to ensure that the writing of the data onto the CD media is continuous as shown by line 340. This is because, if the CD-R drive ever runs out of data to write, the write operation would be interrupted, which would cause the CD media to be completely ruined. Therefore, it is essential that the CD-R drive buffer be continuously filled to a point that ensures that it will always have data to write to the CD media once a write operation has begun. However, it is noted that drives of different manufactures may begin the writing (i.e., burning of data) slightly before or after point 305.

After point 305, the CD-R drive 210 will have a full drive buffer that was filled during the RAM-to-RAM transfer performed in time 302, and the CD-R drive 210 will be calibrated and ready to begin writing (or may already have begun the writing). Once the writing begins, the CD-R drive 210 will release the bus.. As used herein, a well known "write thread" of software code that drives the CD-R drive 210 will go to sleep during the bus release, however, the CD-R drive 210 will actually continue writing data to the media. As is well known, the write thread of the data-writing peripheral device is the one that is responsible for performing the data bursts 308. During the time that the write thread is asleep, the write thread will not be utilizing the IDE/ATAPI bus, thereby freeing up the bus during a time 306 (i.e., making the bus available to a slave peripheral device). As shown in timing diagram 342, the slave peripheral device 212 will be able to access the IDE/ATAPI bus during a time 326 which lies between points 305 and 307, when the CD-R drive has released the IDE/ATAPI bus. However, to ensure that the drive buffer retains a minimum amount of data, a data burst will generally occur when the drive buffer has emptied to a programmable point, and thereby reached a critical level.

In one embodiment, the critical level in the drive buffer is reached when the drive buffer has between about 25% and about 95% data of full capacity (i.e., data remaining in the buffer), and more preferably between about 50% and about 85% data of full capacity, and most preferably about 75% data of full capacity. Therefore, in the most preferred embodiment, when about 25% of the original data has been emptied during the writing process (i.e., burned into the CD media), the write thread of the CD-R drive will initiate a new data burst during which a number of 64K bytes transactions 318 are transferred to the drive buffer from the system buffer 220. As will be discussed in greater detail below, once the critical level is detected, a request is made to the CD-R drive to ascertain the exact memory space that is available in the CD-R buffer before the 64K byte transactions 318 are transmitted to the CD-R buffer over the IDE/ATAPI bus. Although, it should be understood that the individual transactions may be of any size, which may be greater than or less than the exemplary 64K byte transaction.

By way of example, if 256K of space is currently available in the drive buffer, only four 64K transactions 318 will be transmitted during the data burst 308. Of course, if it is detected that more or less space is available in the drive buffer, more or less 64K transactions will be transmitted during the data burst 308. Once the data burst 308 is complete, the write thread of the CD-R drive will again release the IDE/ATAPI bus (i.e., write thread goes to sleep) at a point 309, which therefore frees up the buffer during time 306. During time 306 that lies between points 309 and 310, the bus is again made available to the slave peripheral device. Of course, during time 306 when the bus is free, the CD-R drive 210 will still be continuously writing to the CD media and therefore, during this time the drive buffer will be slightly emptied. At a point 310, the critical level is once again reached, which indicates that the CD-R drive buffer has emptied to a level that is about 75% full. At this point, a request will be made to the CD-R drive to ascertain the actual level of empty space contained within the drive buffer. In this embodiment, the request serves to ensure that the drive buffer is filled to about 100% capacity (i.e., within one write transaction to prevent overflowing), while ensuring that it is not sent more data than it has space for.

For exemplary purposes only, if it is determined that the drive buffer has 384K bytes available, six 64K transactions 318 will be transferred between the RAM 220 of the motherboard 202 and the drive buffer in the CD-R drive in a rapid RAM-to-RAM transfer. As is well known in the art, a RAM-to-RAM transfer may be quite rapid depending on the speed of a bus, and in some cases, may be between about 0.5 megabyte per second and about 17 megabytes per second. Although RAM-to-RAM transfers may become faster in future technologies, Table A below shows a list of exemplary Data transfer protocols and their respective rates.

TABLE A

| Data Transfer Protocol | |
|---|---|
| Protocol Support | Max. Burst Rate |
| PIO Mode 0 | 3.3 MB/sec |
| PIO Mode 1 | 5.2 MB/sec |
| PIO Mode 2 | 8.3 MB/sec |
| PIO Mode 3 | 11.1 MB/sec |
| DMA Mode 0 (multi-word) | 4.2 MB/sec |
| DMA Mode 1 (multi-word) | 13.3 MB/sec |

Once the data burst 308 is complete, the write thread of the CD-R drive 210 will again release the bus (i.e., the write thread goes to sleep) and cause it to be free during time 306. As mentioned above, it should be understood that once the write operation begins as shown by line 340, the write operation will continue uninterrupted for the whole duration while a track is written to the CD media.

Shown below the first timing diagram is an inverse timing diagram 342 of a peripheral device which is connected as a slave to the IDE/ATAPI bus. As illustrated, the peripheral device will be able to access the IDE/ATAPI bus during a time 326, that lies between point 305 and point 307, point 309 and point 310, and so on until the writing operation is complete. However, the peripheral device may not be able to access the IDE/ATAPI bus during a time 328, when the bus is busy by the master CD-R drive 210, during a data burst 308. However, once the data burst 308 is complete, the bus will again be free during time 306, and thus made available during a time 326 for the peripheral slave device. This availability will therefore continue until the CD-R drive is finished writing a complete track in an uninterrupted manner, while the CD-R drive 210 buffer retains enough data to prevent writing breaks during the writing operation.

It should be understood that the bus availability time 326, during which the peripheral slave devices may access the IDE/ATAPI bus is quite substantial compared to the time that it is busy 328. This is because the data bursts time 308 occurs quite rapidly depending on the bus data transfer rate. On the other hand, the time during which the bus is free 306 may be quite substantial depending on the size of the drive buffer and the point at which the programmable critical level is set. In some cases, the bus may be available to slave peripheral devices 9/10 of the time, while only busy 1/10 of the time when the master CD-R drive 210 is transferring data RAM-to RAM.

As can be appreciated, this is a substantial improvement over prior art IDE/ATAPI bus technology, in which the bus is almost continuously busy during an entire write operation. As a further advantage, because the bus is free during times 306, the processor 201 of the motherboard 202 of FIG. 2 will no longer be busy during those times, and will therefore be available for processing other requests that are needed during normal computer use.

Figure 4A:
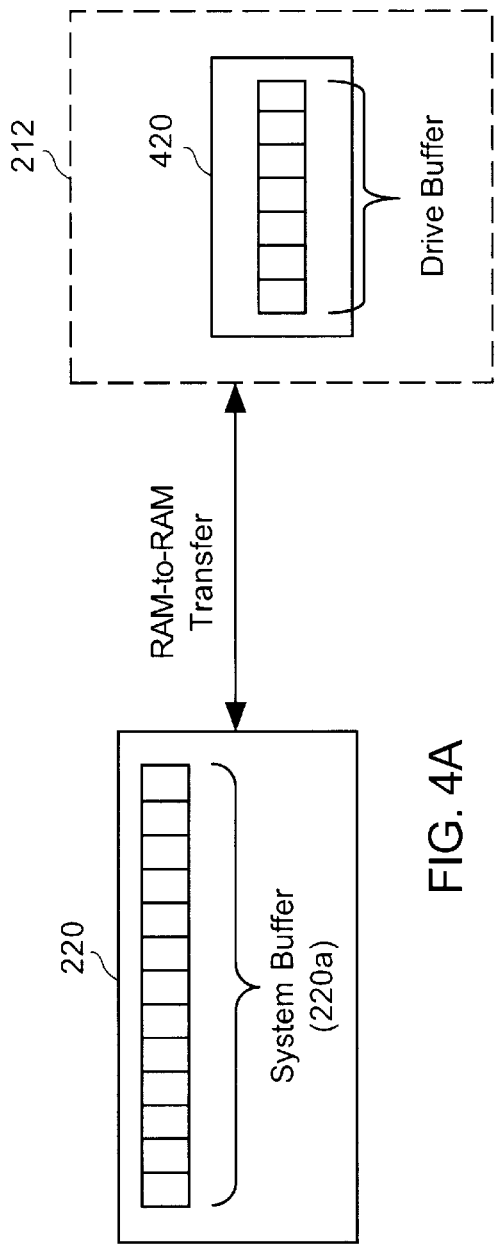
FIG. 4A shows a diagrammatical representation of random access memory that is installed in a motherboard of a host computer system in accordance with one embodiment of the present invention.

FIG. 4A shows a diagrammatical representation of RAM 220 which is installed in the motherboard 202 of a host computer system in accordance with one embodiment of the present invention. Within RAM 220, a pre-determined amount of system buffer 220a is allocated for performing data transfers to a drive buffer 420, that may be contained within a CD-R drive 212. It should be appreciated that the CD-R drive 212 is only an exemplary drive, and other suitable drives such as a CD-RW drive and a DVD drive having a drive buffer 420, may also take advantage of the method for minimizing IDE/ATAPI bus utilization.

Because the data transfers between the system buffer 220a and the drive buffer 420 are performed as RAM-to-RAM transfers, the transfer rate is only limited by the bus transfer rate, which may vary from system to system. Therefore, when the data bursts occur in times 308 of FIG. 3, the time spent performing the data burst is only a small fraction of the repeated combined times 306 and 308.

Figure 4B:
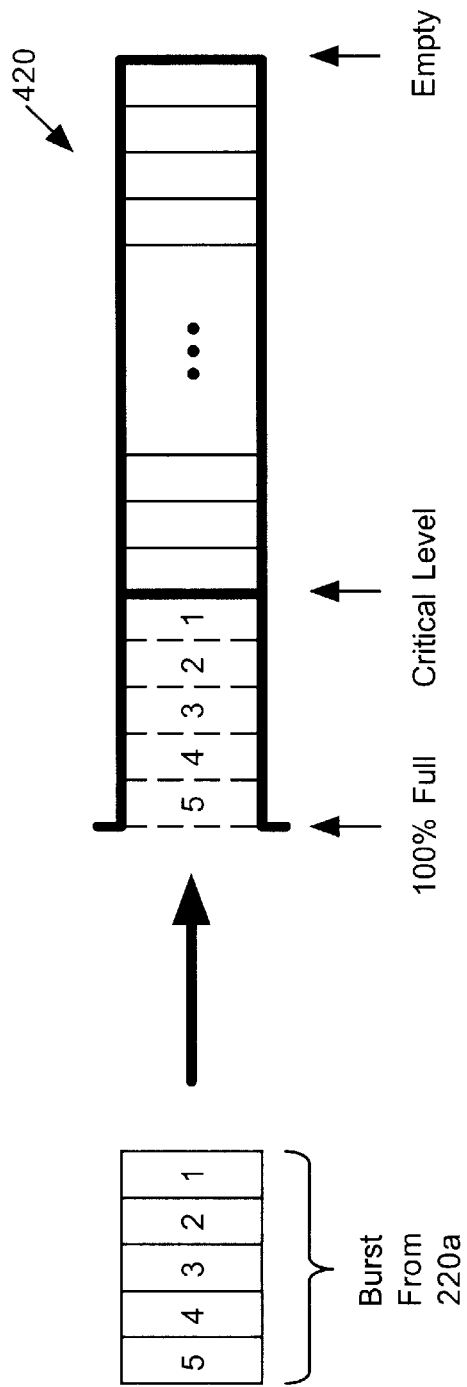
FIG. 4B is a block diagram representation of a drive buffer in accordance with one embodiment of the present invention.

FIG. 4B is a block diagram representation of the drive buffer 420 in accordance with one embodiment of the present invention. In this embodiment, when the drive buffer 420 is determined to have dropped below or reached a critical level, a RAM-to-RAM transfer will occur to effectuate a data burst of the number of transactions (i.e., 64K byte transactions) needed to once again fill the drive buffer 420 to its about 100% full level. In other words, although it is determined that the drive buffer 420 has dropped below or reached the critical level, the drive will be queried to ascertain the actual true amount of RAM space that is open for a RAM-to-RAM transfer burst from the system buffer 220a.

In this example, the critical level is reached after the drive buffer 420 has written five 64K byte transactions, and therefore the burst from the system buffer 220a will only perform a RAM-to-RAM transfer of the next five 64K byte transactions. In this manner, the burst from the system buffer 220a will accurately only transfer the number of transactions for which there is space in the drive buffer 420. As can be appreciated, by transferring only those transactions for which there is space in the drive buffer 420, the buffer 420 will not overflow with data which may cause a stall in the drive 212, or cause the bus to be tied up.

Figure 5A:
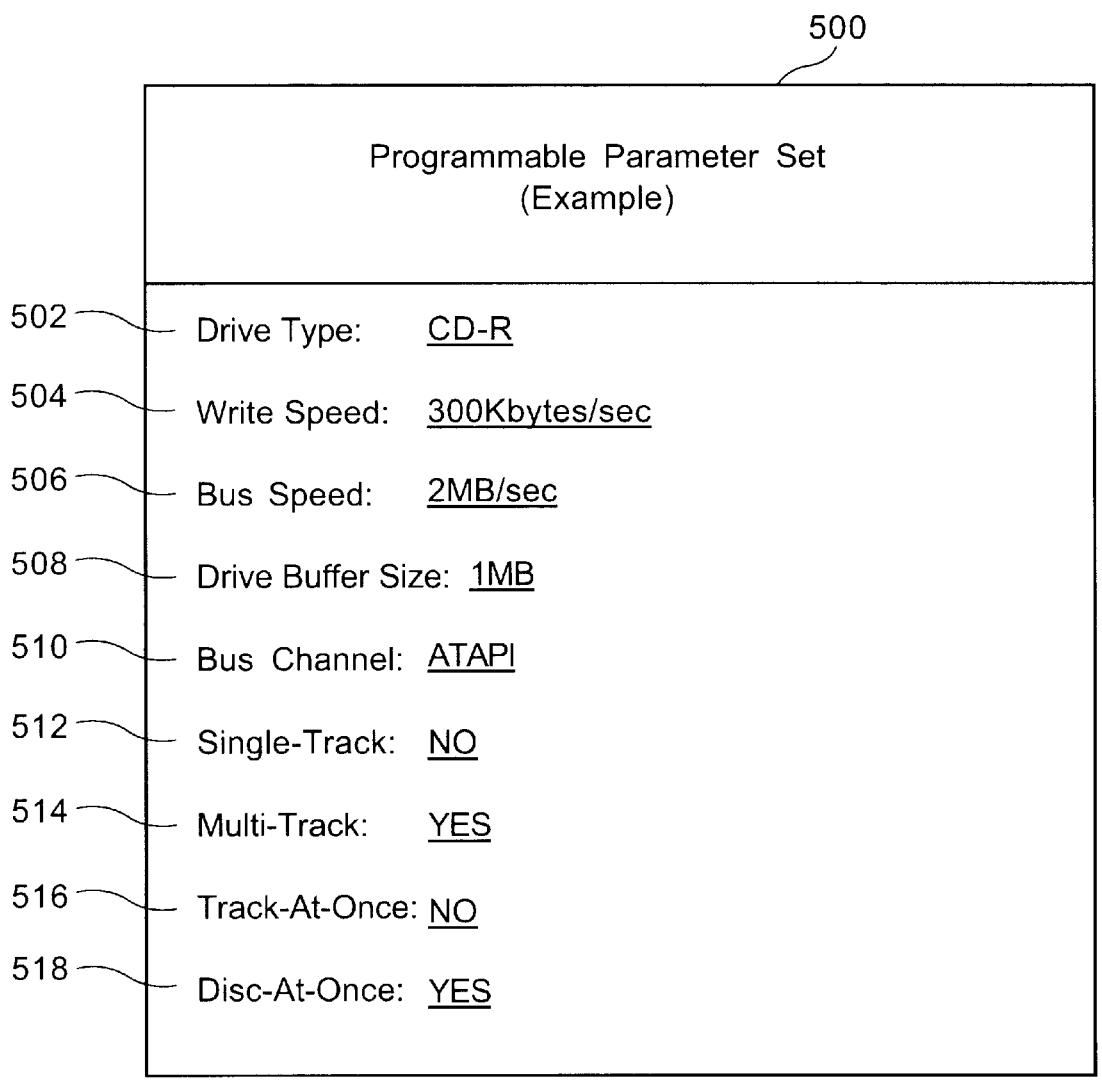
FIG. 5A shows a table having a set of programmable parameters in accordance with one embodiment of the present invention.

FIG. 5A shows a table 500 having a programmable parameter set in accordance with one embodiment of the present invention. As shown, the programmable parameter set table 500 includes several parameters that may be modified, depending on the type of hardware that is configured to utilize the efficient bus utilization methods and apparatus of the present invention. In this example parameter set, the drive type 502 is selected to be a CD-R drive, although any other drive, such as a CD-RW drive and a DVD drive may also benefit from the optimum bus utilization described herein.

One parameter is a write speed 504 parameter, that may be any speed selected by the user. By way of example, the speed may be a 1× speed (i.e., 150K bytes/second), 2×, 4×, etc. In this example, the write speed is set to 300K bytes/seconds, which corresponds to a 2× speed. The next parameter is a bus speed 506 parameter. Generally, the bus speed may be any suitable speed that is designed for a particular protocol, such as an IDE/ATAPI protocol, a parallel port protocol, or any other suitable protocols. In this example, the bus speed 506 is set to 2 MB/seconds. The next parameter is a drive buffer size 508 parameter, which designates the size of the buffer cache that is physically integrated into the peripheral device, such as, the CD-R drive 210.

The next parameter is a bus channel 510 parameter, which designates the type of bus that is utilizing the efficient bus utilization of the present invention. In this example, the bus channel is an IDE/ATAPI channel (may be primary or secondary), however, the bus channel may be any number of channels including, a parallel port, etc. The next 4 parameters are used to designate the type of writing operation that may be performed, for example, a single-track 512, a multi track 514, a track-at-once 516, and a disc-at-once 518. These parameters may be programmably set depending on the type of drive and type of writing desired. In general, it should be appreciated that the efficient bus utilization method of the present invention is completely self-adjusting, depending on the type of hardware and writing parameters desired. In addition, the methods are dynamic in that the parameter set may be modified at any time, depending on the needs of a particular system.

For a specific example, reference will be made to both FIGS. 3 and 5A, where it will be assumed that the amount of allocated buffer space in the system buffer 220 is 3 M bytes, and the drive buffer 420 is 1M byte. Assume also that the write speed of the CD-R drive 210 is 300K bytes per second, the critical level is programmed to be 75%, and the bus speed is 3M bytes per second. Therefore, when the drive buffer 210 reaches a critical level of about 750K bytes, the CD-R drive 210 will be asked what the actual level of availability is in the drive buffer 210. In this example, assume that the actual level of availability is 256K bytes. Because each transaction in a data burst 308 is 64K bytes in this embodiment, only four 64K bytes will be transferred at 3M bytes per second.

Therefore, the 256K bytes will be transferred (i.e., RAM-to-RAM) in about 85 ms. This should be contrasted with the time it takes a 300K bytes/second CD-R drive to burn-in 256K bytes, which is about 853 ms. With these exemplary parameters, the free bus time 306 is about 853 ms, while the busy data burst time 308 is about 85 ms. As this example shows, the busy time will only be about 9.06% of the time, which therefore leaves the bus available for about 90.94% of the time. Compared to the prior art IDE/ATAPI technique, this is a very significant improvement.

Figure 5B:
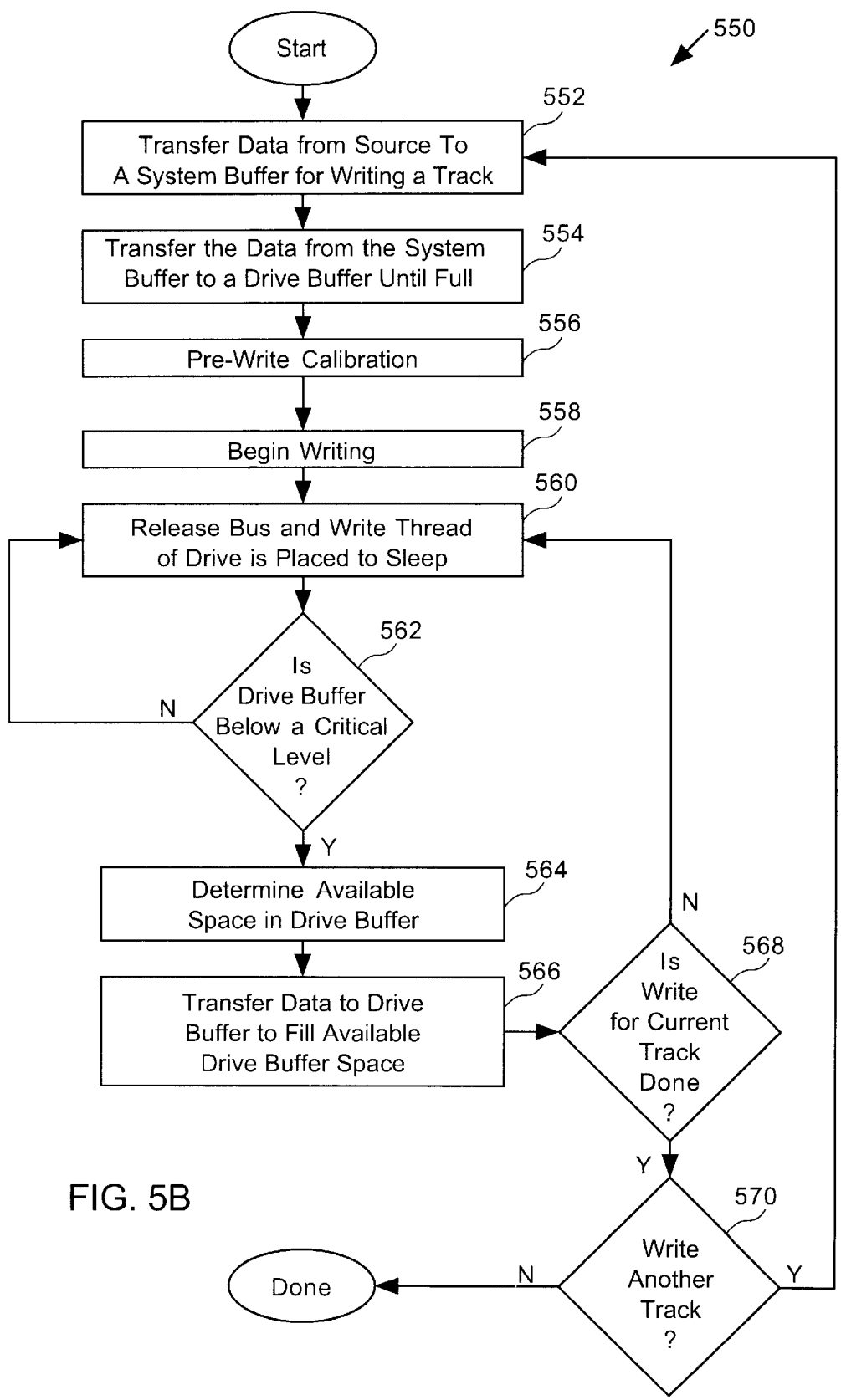
FIG. 5B is a flowchart diagram illustrating the method operations for efficient bus utilization in accordance with one embodiment of the present invention.

FIG. 5B is a flowchart diagram 550 illustrating the method operations for efficient bus utilization in accordance with one embodiment of the present invention. The method begins at an operation 552 where a transfer of data from a source, for example, a CD media or hard drive, is performed to a system buffer for writing a track in a CD-R drive. In this embodiment, it is desired that an allocated amount (i.e., 3MB or any other allocated size) of memory within RAM 220 of FIG. 2 is completely filled before any transfers from the system buffer to a drive buffer is performed. Therefore, once the system buffer has been filled, the method may now proceed to an operation 554, where a transfer of data from the system buffer to a drive buffer is performed until the drive buffer is full.

As shown in FIG. 3, the transfer to the drive buffer that occurs during time 302 must be performed until one more transaction (i.e., a 64K byte transaction) that is transferred from the system buffer to the drive buffer occurs. At this point, the method will know that the drive buffer is full. Once the drive buffer is full, the method will proceed to an operation 556 where a pre-write calibration is performed. In general, the pre-write calibration is begun when the "one more" transaction is transferred from the system buffer to the drive buffer. As mentioned above, the pre-write calibration typically includes time for the laser to power-up, for the head mechanics to move to an appropriate location to begin a write, for the drive to complete its laser power calibration, and other well known calibration operations. Once the pre-write calibration is performed in operation 556, the method will proceed to an operation 558 where writing begins.

When writing begins, the CD-R drive will commence burning-in the data into the CD media. Of course, once the writing has commenced, the drive should continue its writing operation to avoid ruining the CD media. Once the pre-write calibration operation is performed and the writing has begun, the method will proceed to an operation 560 where the bus is released and the write thread of the CD-R drive is placed into a sleep mode. During the sleep mode, the drive will not be utilizing bus bandwidth and thereby allow other devices, such as, a CD-ROM drive to access the bus. Because the writing is still being performed while the bus has been released and the write thread of the drive is asleep in operation 560, the method will proceed to a decision operation 562 where it is determined if the drive buffer has reached a critical level.

By way of example, if the drive retains between about 25% and about 95% of its original buffer data capacity, and more preferably, between about 50% and about 85% of its buffer data capacity, and most preferably about 75% of its buffer data capacity, then the critical level is said to have been reached. Of course this level is programmable, taking into account the size of the drive buffer. If the critical level has not been reached, the method will proceed back to operation 560 where the bus will remain released and the write thread of the drive will be asleep. Therefore, the write thread of the drive will remain asleep until the critical level has been reached in the drive buffer, as shown in FIG. 4B above. Once the critical level has been reached, the method will proceed to an operation 564 where the method will determine the actual available space in the drive buffer. By way of example, if the drive buffer is a 1,000K byte buffer, then the critical level may be reached when the buffer still has, in a preferred embodiment, about 750K bytes.

However, in operation 564, the drive is queried to determine the actual level in the drive buffer. In one embodiment, the drive may be queried by using a drive's ReadBuffer Capacity ( ) command. This is because the drive buffer may actually have more or less than 750K bytes depending on the amount of time it took for the drive to ascertain its buffer level. Therefore, operation 556 will enable the data burst (i.e., data burst 308 of FIG. 3) to transfer only the amount of data for which there is space. Once the actual available space in the drive buffer is determined, the method will proceed to an operation 566 where a data transfer to the drive buffer is performed to fill the available drive buffer space to its maximum capacity.

At this point, the method will proceed to a decision operation 568 where it is determined whether the write operation for a current track is done. If it is not done, the method will again proceed to operation 560 where the bus is released and the write thread of the drive goes to sleep to enable other peripheral devices (i.e., a slave device) to access the bus. Next, the method will again proceed through operations 562, 564, 566, and then back to 568. Once it is determined that the write operation for the current track is done, the method will proceed to a decision operation 570 where it is determined whether there is another track to write. If there is another track to write, then the method will proceed back up to operation 552 where the method may again begin for a next track. Once the desired tracks have been completed for a particular write operation, the method will be done.

The present invention may be implemented using any type of integrated circuit logic, state machines, or software driven computer-implemented operations. By way of example, a hardware description language (HDL) based design and synthesis program may be used to design the silicon-level circuitry necessary to appropriately perform the data and control operations in accordance with one embodiment of the present invention. By way of example, a VHDL® hardware description language available from IEEE of New York, N.Y. may be used to design an appropriate silicon-level layout. Although any suitable design tool may be used, another layout tool may include a hardware description language "Verilog®" tool available from Cadence Design Systems, Inc. of Santa Clara, Calif.

The invention may employ various computer-implemented operations involving data stored in computer systems to drive computer peripheral devices (i.e., in the form of software drivers). These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 6:
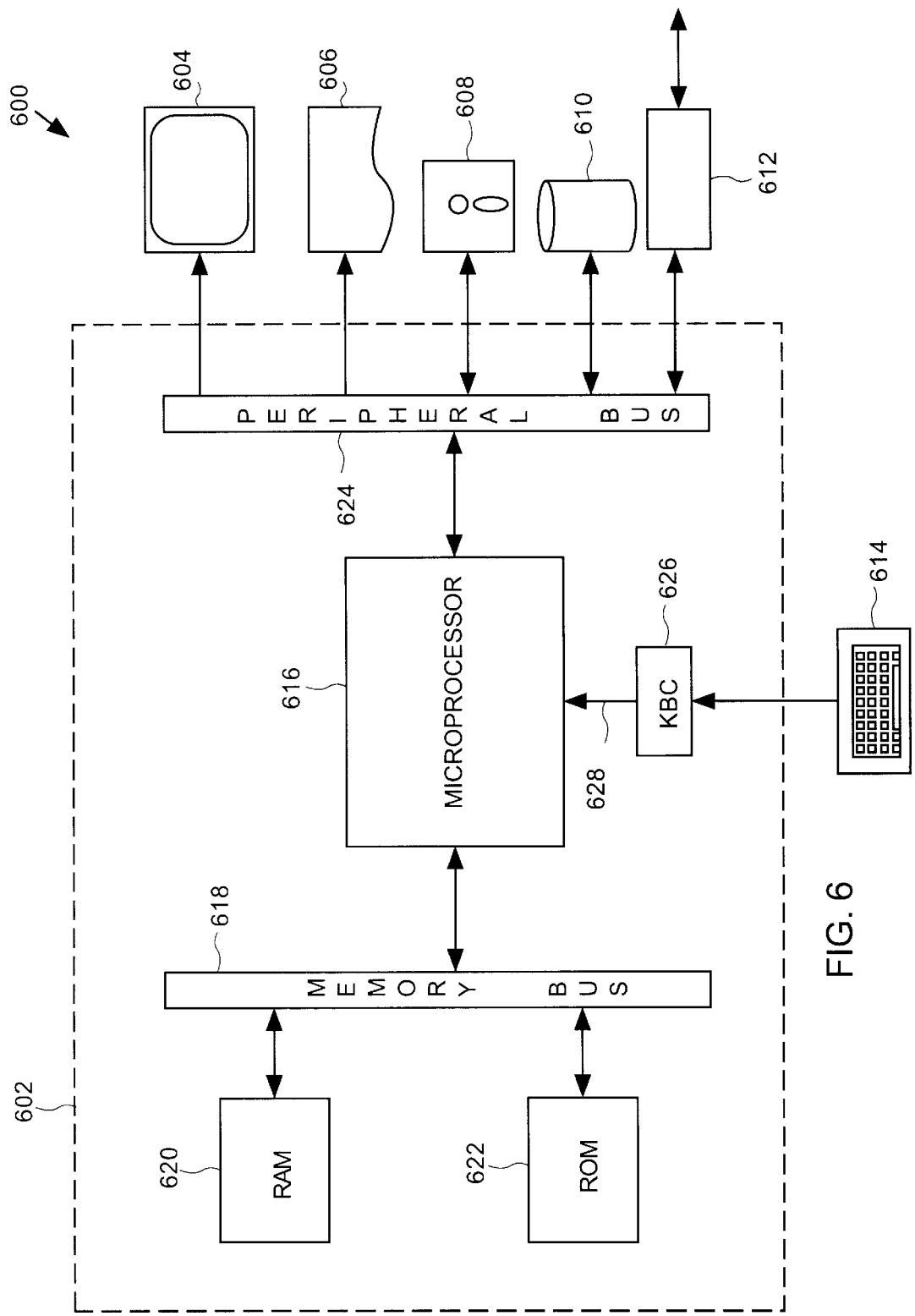
FIG. 6 is a block diagram of an exemplary computer system for carrying out some of the processing according to the invention.

FIG. 6 is a block diagram of an exemplary computer system 600 for carrying out the processing according to the invention. The computer system 600 includes a digital computer 602, a display screen (or monitor) 604, a printer 606, a floppy disk drive 608, a hard disk drive 610, a network interface 612, and a keyboard 614. The digital computer 602 includes a microprocessor 616, a memory bus 618, random access memory (RAM) 620, read only memory (ROM) 622, a peripheral bus 624, and a keyboard controller 626. The digital computer 600 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 616 is a general purpose digital processor which controls the operation of the computer system 600. The microprocessor 616 can be a single-chip processor or can be implemented with multiple components. Using instructions retrieved from memory, the microprocessor 616 controls the reception and manipulation of input data and the output and display of data on output devices. According to the invention, a particular function of microprocessor 616 is to assist in the improved bus utilization methods and apparatus.

The memory bus 618 is used by the microprocessor 616 to access the RAM 620 and the ROM 622. The RAM 620 is used by the microprocessor 616 as a general storage area and as scratch-pad memory, and can also be used to store input data and processed data. The ROM 622 can be used to store instructions or program code followed by the microprocessor 616 as well as other data.

The peripheral bus 624 is used to access the input, output, and storage devices used by the digital computer 602. In the described embodiment, these devices include the display screen 604, the printer device 606, the floppy disk drive 608, the hard disk drive 610, and the network interface 612. The keyboard controller 626 is used to receive input from keyboard 614 and send decoded symbols for each pressed key to microprocessor 616 over bus 628.

The display screen 604 is an output device that displays images of data provided by the microprocessor 616 via the peripheral bus 624 or provided by other components in the computer system 600. The printer device 606 when operating as a printer provides an image on a sheet of paper or a similar surface. Other output devices such as a plotter, typesetter, etc. can be used in place of, or in addition to, the printer device 606.

The floppy disk drive 608 and the hard disk drive 610 can be used to store various types of data. The floppy disk drive 608 facilitates transporting such data to other computer systems, and hard disk drive 610 permits fast access to large amounts of stored data.

The microprocessor 616 together with an operating system operate to execute computer code and produce and use data. The computer code and data may reside on the RAM 620, the ROM 622, or the hard disk drive 610. The computer code and data could also reside on a removable program medium and loaded or installed onto the computer system 600 when needed. Removable program mediums include, for example, CD-ROM, PC-CARD, floppy disk and magnetic tape.

The network interface 612 is used to send and receive data over a network connected to other computer systems. An interface card or similar device and appropriate software implemented by the microprocessor 616 can be used to connect the computer system 600 to an existing network and transfer data according to standard protocols.

The keyboard 614 is used by a user to input commands and other instructions to the computer system 600. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. By way of example, although the above described embodiments show the data-writing devices (e.g., the CD-R, CD-RW, DVD, etc.) being connected as "master devices" and other peripheral devices connected as "slave devices," the embodiments of the present invention are equally applicable to the reverse situation. That is, the data-writing devices may be connected as "slave" devices and the other peripheral devices may be connected as "master" devices. Accordingly, the present embodiments are to be considered as illustrative and not restrictive, and the invention is not to be limited to the details given herein, but may be modified within the scope and equivalents of the appended claims.

What is claimed is:

1. A method for sharing an I/O bus connection by peripheral devices, the peripheral devices including a first CD-R peripheral device that is connected to the I/O bus connection, and a second peripheral device that is connected to the I/O bus connection, the I/O bus being an IDE/ATAPI bus connection, the first CD-R peripheral device and the second peripheral device being IDE/ATAPI devices, comprising:

transferring data to a drive buffer that is in the first CD-R peripheral device, the transferring being configured to continue until the drive buffer has reached a full state;

performing a pre-write calibration of the first CD-R peripheral device after the drive buffer has reached the full state;

commencing a writing of a portion of the data contained in the drive buffer to a compact disc, such that the first data received by the drive buffer is written first; and releasing the I/O bus connection by placing a write thread of the first CD-R peripheral device in a sleep mode but still continuing the writing of the portion of data contained in the drive buffer, such that when the write thread of the first CD-R peripheral device is in the sleep mode the 1/0 bus connection is made available to the second peripheral device while the first CD-R peripheral device is not transferring data to the drive buffer.

2. A method for sharing an I/O bus connection by peripheral devices as recited in claim 1, further comprising:

determining when the data contained in the drive buffer has been reduced to a critical level.

3. A method for sharing an I/O bus connection by peripheral devices as recited in claim 2, wherein when the drive buffer has been reduced to a critical level, the method includes:

querying the first CD-R peripheral device to ascertain an actual amount of free space in the drive buffer.

4. A method for sharing an I/O bus connection by peripheral devices as recited in claim 3, wherein when the actual amount of free space in the drive buffer is ascertained, the write thread of the first CD-R peripheral device is configured to wake from the sleep mode.

5. A method for sharing an I/O bus connection by peripheral devices as recited in claim 4, wherein when the write thread of the first CD-R peripheral device has awaken from the sleep mode, a burst of data that is configured to fill the actual amount of free space in the drive buffer is performed.

6. A method for sharing an I/O bus connection by peripheral devices as recited in claim 5, wherein the burst of data is a transfer of data from an allocated memory in a host to the drive buffer.

7. A method for sharing an I/O bus connection by peripheral devices as recited in claim 6, wherein the transfer of data from the allocated memory in the host to the drive buffer is performed at a bus speed as a RAM-to-RAM operation.

8. A method for sharing an I/O bus connection by peripheral devices, the peripheral devices including a first CD-R peripheral device that is connected to the I/O bus connection, and a second peripheral device that is connected to the I/O bus connection, comprising:

transferring data to a drive buffer that is in the first CD-R peripheral device, the transferring being configured to continue until the drive buffer has reached a full state;

performing a pre-write calibration of the first CD-R peripheral device after the drive buffer has reached the full state;

commencing a writing of a portion of the data contained in the drive buffer to a compact disc, such that the first data received by the drive buffer is written first;

releasing the I/O bus connection by placing a write thread of the first CD-R peripheral device in a sleep mode but still continuing the writing of the portion of data contained in the drive buffer, such that when the write thread of the first CD-R peripheral device is in the sleep mode the bus connection is made available to the second peripheral device while the first CD-R peripheral device is not transferring data to the drive buffer;

determining when the data contained in the drive buffer has been reduced to a critical level, wherein when the drive buffer has been reduced to a critical level, the method further includes, querying the first CD-R peripheral device to ascertain an actual amount of free space in the drive buffer, and when the actual amount of free space in the drive buffer is ascertained, the write thread of the first CD-R peripheral device is configured to wake from the sleep mode, and when the write thread of the first CD-R peripheral device has awaken from the sleep mode, a burst of data that is configured to fill the actual amount of free space in the drive buffer is performed; and determining whether the first CD-R peripheral device has written an entire track.

9. A method for sharing an I/O bus connection by peripheral devices as recited in claim 8, wherein when the entire track has been written by the first CD-R peripheral device, and a new track is required to be written, the method further comprises:

performing an initial transfer of data for the new track, the transfer being configured to continue until the drive buffer has reached the full state.

10. A method for sharing an I/O bus connection by peripheral devices as recited in claim 1, further comprising:

transferring data from a source media to a system buffer of a host before the transfer of the data to the drive buffer of the first CD-R is performed, the transfer of the data from the source media to the system buffer being configured to continue until the system buffer reaches a full state.

11. A system for minimizing utilization of an I/O bus by a first data-writing peripheral device that is connected to the I/O bus, the system also includes a second peripheral device that shares the I/O bus connection, the I/O bus being an IDE/ATAPI bus connection, the first data-writing peripheral device and the second peripheral device being IDE/ATAPI devices, comprising:

transferring data to a drive buffer that is in the first data-writing peripheral device, the transferring being configured to continue until the drive buffer has reached a full state;

performing a pre-write calibration of the first data-writing peripheral device after the drive buffer has reached the full state;

commencing a writing of a portion of the data contained in the drive buffer to a compact disc, such that the first data received by the drive buffer is written first; and releasing the I/O bus connection by placing a write thread of the first data-writing peripheral device in a sleep mode but still continuing the writing of the portion of data contained in the drive buffer, such that when the write thread of the first data-writing peripheral device is in the sleep mode the I/O bus connection is made available to the second peripheral device while the first data-writing peripheral device is not transferring data to the drive buffer.

12. A system for minimizing utilization of an I/O bus by a first data-writing peripheral device as recited in claim 11, further comprising:

determining when the data contained in the drive buffer has been reduced to a critical level.

13. A system for minimizing utilization of an I/O bus by a first data-writing peripheral device as recited in claim 12, wherein when the drive buffer has been reduced to a critical level, the method includes:

querying the first data-writing peripheral device to ascertain an actual amount of free space in the drive buffer.

14. A system for minimizing utilization of an I/O bus by a first data-writing peripheral device as recited in claim 13, wherein when the actual amount of free space in the drive buffer is ascertained, the write thread of the first data-writing peripheral device is configured to wake from the sleep mode.

15. A system for minimizing utilization of an I/O bus by a first data-writing peripheral device as recited in claim 14, wherein when the write thread of the first data-writing peripheral device has come out of the sleep mode, the a burst of data that is configured to fill the actual amount of free space in the drive buffer is performed by the write thread.

16. A system for minimizing utilization of an I/O bus by a first data-writing peripheral device as recited in claim 15, wherein the burst of data is a transfer of data from an allocated memory in a host to the drive buffer.

17. A system for minimizing utilization of an I/O bus by a first data-writing peripheral device as recited in claim 16, wherein the transfer of data from the allocated memory in the host to the drive buffer is performed at a bus speed as a RAM-to-RAM operation.

18. A system for minimizing utilization of an I/O bus by a first data-writing peripheral device as recited in claim 11, wherein the first data-writing peripheral device is selected from the group consisting of a CD-R peripheral device, a CD-RW peripheral device and a DVD peripheral device.

19. An apparatus for minimizing utilization of an I/O bus by a first data-writing peripheral device that is connected to the I/O bus, the apparatus also includes a second peripheral device that shares the I/O bus connection, the I/O bus being an IDE/ATAPI bus connection, the first data-writing peripheral device and the second peripheral device being IDE/ATAPI devices, comprising:

a drive buffer that is contained in the first data-writing peripheral device is configured to receive data until the drive buffer has reached a full state;

a writing mechanism of the first data-writing peripheral device being configured to commence writing of a portion of the data contained in the drive buffer to a compact disc; and wherein a write thread of the first data-writing peripheral device is paced into a sleep mode while the writing mechanism is writing the portion of the data contained in the drive buffer, such that when the write thread of the first data-writing peripheral device is in the sleep mode, the I/O bus connection is made available to the second peripheral device.

20. An apparatus for minimizing utilization of an I/O bus by a first data-writing peripheral device that is connected to the I/O bus as recited in claim 19, wherein when the write thread of the first data-writing peripheral device is in the sleep mode when the drive buffer is not receiving data.

21. An apparatus for minimizing utilization of an I/O bus by a first data-writing peripheral device that is connected to the I/O bus as recited in claim 20, wherein a pre-write calibration unit of the first data-writing peripheral device performs pre-write calibration after the drive buffer has reached the full state and before the writing mechanism of the first data-writing peripheral device commences writing.

22. An apparatus for minimizing utilization of an I/O bus by a first data-writing peripheral device that is connected to the I/O bus as recited in claim 21, wherein a critical level is reached when data contained in the drive buffer has been reduced to a predetermined amount.

23. An apparatus for minimizing utilization of an I/O bus by a first data-writing peripheral device that is connected to the I/O bus as recited in claim 22, wherein the first data-writing peripheral device is contacted when the critical level is reached to ascertain an exact level of available space in the drive buffer.

24. An apparatus for minimizing utilization of an I/O bus by a first data-writing peripheral device that is connected to the I/O bus as recited in claim 23, wherein the drive buffer is provided with a data burst to fill up the exact level of available space in the drive buffer.

25. An apparatus for minimizing utilization of an I/O bus by a first data-writing peripheral device that is connected to the I/O bus as recited in claim 23, wherein the write thread of the first data-writing peripheral devices is reverted back to the sleep mode until a next critical level.

26. An apparatus for minimizing utilization of an I/O bus by a first data-writing peripheral device that is connected to the I/O bus as recited in claim 25, wherein the first data-writing peripheral device is selected from the group consisting of a CD-R peripheral device, a CD-RW peripheral device and a DVD peripheral device.

27. A computer readable media containing program instructions to be executed on a central processing unit for minimizing utilization of an I/O bus by a first data-writing peripheral device that is connected to the I/O bus, a second peripheral device is also configured to share the I/O bus connection, the I/O bus being an IDE/ATAPI bus connection, the first data-writing peripheral device and the second peripheral device being IDE/ATAPI devices, the computer readable media comprising:

program instructions for transferring data to a drive buffer that is in the first data-writing peripheral device, the transferring being configured to continue until the drive buffer has reached a full state;

program instructions for commencing a writing of a portion of the data contained in the drive buffer to a compact disc; and program instructions for releasing the I/O bus connection by placing a write thread of the first data-writing peripheral device in a sleep mode but still continuing the writing of the portion of data contained in the drive buffer, such that when the write thread of the first data-writing peripheral device is in the sleep mode the I/O bus connection is made available to the second peripheral device while the first data-writing peripheral device is not transferring data to the drive buffer.

28. A computer readable media containing program instructions to be executed on a central processing unit for minimizing utilization of an I/O bus as recited in claim 27, further including program instructions for causing the a first data-writing peripheral device to re-acquire the I/O bus when the drive buffer has reached a critical level.

29. A computer readable media containing program instructions to be executed on a central processing unit for minimizing utilization of an I/O bus as recited in claim 28, further including program instructions for transferring data to the drive buffer to place the drive buffer in the full state; and program instructions for placing the write thread of the first data-writing peripheral device back to the sleep mode until a next critical level is reached.

30. A method for sharing an I/O bus connection by peripheral devices, the peripheral devices including a first CD-R peripheral device that is connected to the I/O bus connection, and a second peripheral device that is connected to the I/O bus connection, comprising:

transferring data to a drive buffer that is in the first CD-R peripheral device, the transferring being configured to continue until the drive buffer has reached a substantially full state;

commencing a writing of a portion of the data contained in the drive buffer;

releasing the I/O bus connection by placing the first CD-R peripheral device in a sleep mode but still continuing the writing of the portion of data contained in the drive buffer, such that when the first CD-R peripheral device is in the sleep mode the I/O bus connection is made available to the second peripheral device while the first CD-R peripheral device is not transferring data to the drive buffer;

determining when the data contained in the drive buffer has been reduced to a critical level, and when the drive buffer has been reduced to a critical level, the method further includes, querying the first CD-R peripheral device to ascertain an actual amount of free space in the drive buffer, and when the actual amount of free space in the drive buffer is ascertained, the first CD-R peripheral device is configured to wake from the sleep mode and receive a burst of data to substantially fill the actual amount of free space in the drive buffer.

31. A method for sharing an I/O bus connection by peripheral devices as recited in claim 30, further comprising:

determining whether the first CD-R peripheral device has written an entire track.

32. A method for sharing an I/O bus connection by peripheral devices as recited in claim 31, wherein when the entire track has been written by the first CD-R peripheral device, and a new track is required to be written, the method further comprises:

performing an initial transfer of data for the new track, the transfer being configured to continue until the drive buffer has reached the substantially full state.

* * * * *